US012483838B2

(12) United States Patent
Qiang et al.

(10) Patent No.: US 12,483,838 B2
(45) Date of Patent: Nov. 25, 2025

(54) ELASTIC SUPPORT, ELECTRONIC DEVICE AND TERMINAL

(71) Applicant: Goertek Inc., Shandong (CN)

(72) Inventors: Shousong Qiang, Shandong (CN); Jianbin Yang, Shandong (CN)

(73) Assignee: Goertek Inc., Weifang (CN)

( * ) Notice: Subject to any disclaimer, the term of this patent is extended or adjusted under 35 U.S.C. 154(b) by 240 days.

(21) Appl. No.: 18/270,306

(22) PCT Filed: Aug. 24, 2021

(86) PCT No.: PCT/CN2021/114301
§ 371 (c)(1),
(2) Date: Jun. 29, 2023

(87) PCT Pub. No.: WO2022/160684
PCT Pub. Date: Aug. 4, 2022

(65) Prior Publication Data

US 2024/0179470 A1 May 30, 2024

(30) Foreign Application Priority Data

Jan. 29, 2021 (CN) ........................ 202110133943.1

(51) Int. Cl.
*H04R 9/06* (2006.01)
*H04R 1/06* (2006.01)
*H04R 9/04* (2006.01)

(52) U.S. Cl.
CPC ............... *H04R 9/043* (2013.01); *H04R 1/06* (2013.01); *H04R 9/045* (2013.01); *H04R 9/06* (2013.01); *H04R 2499/11* (2013.01)

(58) Field of Classification Search
CPC .......... H04R 1/06; H04R 1/288; H04R 9/025; H04R 9/043; H04R 9/045; H04R 9/046; H04R 9/06; H04R 2499/11
See application file for complete search history.

(56) References Cited

U.S. PATENT DOCUMENTS

2014/0334655 A1* 11/2014 Gao ...................... H04M 1/035 381/334
2023/0232157 A1* 7/2023 Liu ........................ H04R 9/043 381/400
2023/0239631 A1* 7/2023 Liu ........................ H04R 9/025 381/412

FOREIGN PATENT DOCUMENTS

| | | | |
|---|---|---|---|
| CN | 106888421 | A | 6/2017 |
| CN | 211930861 | U | 11/2020 |
| CN | 21215661 | U | 12/2020 |
| CN | 212086477 | U | 12/2020 |

(Continued)

*Primary Examiner* — Huyen D Le
(74) *Attorney, Agent, or Firm* — Baker Botts LLP

(57) ABSTRACT

Disclosed subject matter includes an elastic support, an electronic device, and a terminal. The elastic support comprises two installation parts and an elastic part connected between the two installation parts, the elastic part is in a polyline structure consisting of straight lines and/or curves, and one end of each installation part away from the elastic part is connected with a stationary component or a component that reciprocatively vibrates in a first direction; at least one of the installation parts is provided with a first cushioning part, at least partial structure of which is bent from the end of the installation part away from the elastic part toward the first direction.

18 Claims, 14 Drawing Sheets

(c)

(d)

(56) References Cited

FOREIGN PATENT DOCUMENTS

CN 112969132 A 6/2021

* cited by examiner (a)

(b)

(c)

(d)

(g)

(h)

(k)

(m)

(i)

(j)

ELASTIC SUPPORT, ELECTRONIC DEVICE AND TERMINAL

CROSS-REFERENCE TO RELATED APPLICATIONS

This application is a National Stage of International Application No. PCT/CN2021/114301, filed on Aug. 24, 2021, which claims priority to Chinese Patent Application No. 202110133943.1, filed on Jan. 29, 2021, both of which are hereby incorporated by reference in their entireties.

TECHNICAL FIELD

The present disclosure relates to the electroacoustic field, in particular to an elastic support, an electronic device and a terminal.

BACKGROUND

An electronic device, such as a sound production device, is an important acoustic component in an electronic apparatus, which is a transducer device that converts electrical signals into acoustic signals. At present, with continuous progress and innovation of technology, technicians in the field are constantly seeking innovation and changes in the structural design of a traditional speaker, which requires both the development trend of miniaturization and an increasing focus on optimizing performance, and simplifies processes and controls costs.

In existing speakers, when assembling a damper with a voice coil and a bracket such as a housing or yoke, a straight portion of the damper contacts pads of the voice coil or the bracket, is coated with solder paste, and the paste is melted by laser soldering to fix the damper to the pads. However, in this way, during vibration of the voice coil, a part of the structure of the damper is pulled by a rotary force, which results in easy breakage and detachment of solder joints between the damper and the pads, resulting in failure and low reliability of the assembly between the damper and the voice coil or the bracket.

SUMMARY

The present disclosure mainly aims at providing an elastic support, an electronic device, and a terminal, which is intended to solve the problem of failure and low reliability of the assembly between the damper and the voice coil or the bracket in the prior art.

To achieve the above objective, the present disclosure proposes an elastic support, which comprises two installation parts and an elastic part connected between the two installation parts, the elastic part is in a polyline structure consisting of straight lines and/or curves, and one end of each installation part away from the elastic part is connected with a stationary component or a component that reciprocatively vibrates in a first direction;

at least one of the installation parts is provided with a first cushioning part, at least partial structure of which first cushioning part is bent from the end of the installation part away from the elastic part toward the first direction.

Preferably, the installation part is in smooth transition connection with the first cushioning part.

Preferably, the first cushioning part comprises a first connection segment and a first arc segment, the first connection segment is connected with a component reciprocating in the first direction, and the first connection segment is in smooth transition connection with the installation part through the first arc segment.

Preferably, the elastic part is a planar structure arranged in a second direction, and is located in the same horizontal plane as the two installation parts, and the first direction and the second direction are perpendicular to each other.

Preferably, the first arc segment is a circular arc segment whose inner concave surface is disposed facing away from the elastic part, and the first connection segment is a straight segment forming an angle of 20°~160° with the elastic part.

Preferably, the first connection segment forms an angle of 45°~95° with the elastic part; and/or, the first connection segment has a length greater than or equal to 1.5 mm.

Preferably, the first arc segment is provided in a Z shape, the first connection segment is a straight segment provided at a distance from the elastic part, and the first connection segment and the elastic part are set parallel to each other.

Preferably, the first arc segment comprises two corners, the corner connected with the installation part is a circular arc segment whose inner concave surface is disposed facing away from the elastic part, and the corner connected with the first connection segment is a circular arc segment whose inner concave surface is disposed facing toward the elastic part.

Preferably, a distance between the first connection segment and the elastic part is greater than or equal to 0.5 mm; and/or, the first connection segment has a length greater than or equal to 1.5 mm.

Preferably, the first arc segment is a semi-circular arc segment whose inner concave surface is disposed facing toward the elastic part, and the first connection segment is a straight segment and is located in the same horizontal plane as the elastic part.

Preferably, a distance between the first arc segment and the elastic part is greater than or equal to 0.5 mm; and/or, the first connection segment has a length greater than or equal to 1.5 mm.

Preferably, there is a distance R from a bending midline of the first arc segment to a bending center of the first arc segment, and the first arc segment has a cross section with a width B, wherein R≥2B.

Preferably, each of the two installation parts is provided with the first cushioning part, and two first cushioning parts are of identical structures and are bent in the same direction or opposite directions.

Preferably, the two installation parts are respectively a first installation part and a second installation part, wherein the first installation part is provided with the first cushioning part, the second installation part is provided with the second cushioning part, the second cushioning part is located in the same horizontal plane as the elastic part, and the second cushioning part is bent toward or away from the elastic part from an end of the second installation part which is away from the elastic part.

Preferably, the second cushioning part is an arc segment, one end of which is connected with a stationary component or a component that reciprocatively vibrates in the first direction, and the other end of which is in smooth transition connection with the second installation part; or the second cushioning part comprises a second connection segment and a second arc segment, the second connection segment is connected with a stationary component or a component that reciprocatively vibrates in the first direction, and the second connection segment is in smooth transition connection with the second installation part through the second arc segment.

Preferably, the elastic part comprises a first end connected with one of the two installation parts, and a second end connected with the other end of the two installation parts;

the elastic part is formed by extending the first end to the second end in straight lines and/or curves in the same direction or in different directions.

Preferably, the elastic support is wound from a line-like structure; or, the elastic support is stamped from a sheet structure.

Preferably, the elastic support has a segment cross-section in a closed loop structure formed by curves and/or straight lines.

The present disclosure also proposes an electronic device, the electronic device comprises a bracket, a vibration unit and the elastic support of any one, the elastic support is configured to counterbalance vibration of the vibration unit in the first direction; the vibration unit comprises a diaphragm and a voice coil connected with the diaphragm; the two installation parts are connected with the voice coil and the bracket, respectively;

and/or, the bracket is a housing or a magnetic yoke.

The present disclosure also proposes a terminal, which comprises the above electronic device.

In the technical solution of the present disclosure, when the elastic support is assembled with the voice coil and the bracket such as the housing or the yoke, the first cushioning part of the elastic support may be in contact with the voice coil or the pad of the bracket, is coated with solder paste, and the paste is melted by laser soldering to fix the elastic support to the pad, therefore achieving assembly of the elastic support and the voice coil or the bracket. While in the elastic support in this embodiment, at least partial structure of the first cushioning part is bent in a direction consistent with the vibration direction of the vibration unit, such that at least partial structure of the first cushioning part is not affected by the vertical vibrations of the vibration unit, and thus the partial structure will not be pulled by the rotary force, has good fatigue resistance, is not prone to the fracture and detachment of the solder joints of the elastic support and the pad, therefore guaranteeing efficient and highly reliable assembly between the elastic support and the voice coil or bracket.

BRIEF DESCRIPTION OF THE DRAWINGS

In order to clearly illustrate embodiments of the present disclosure or technical solutions in the prior art, accompanying drawings that need to be used in description of the embodiments or the prior art will be briefly introduced as follows. Obviously, drawings in following description are only the embodiments of the present disclosure. For those skilled in the art, other drawings can also be obtained according to the disclosed drawings without creative efforts.

Figure 4:
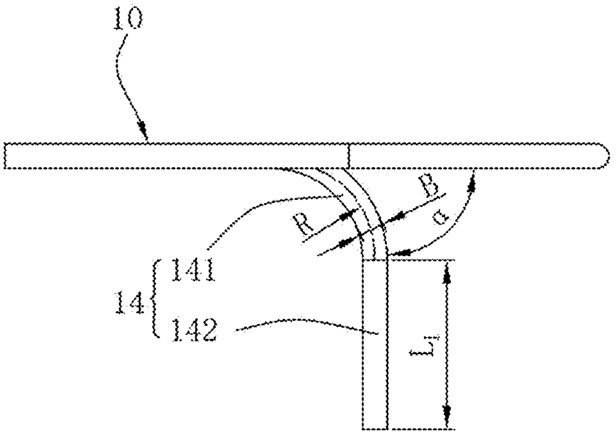
Figure 4:
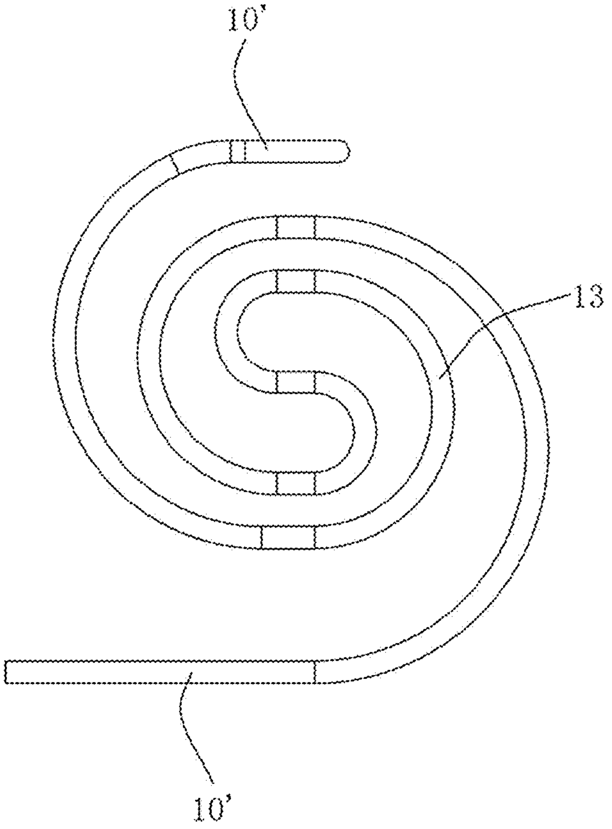
Figure 5:
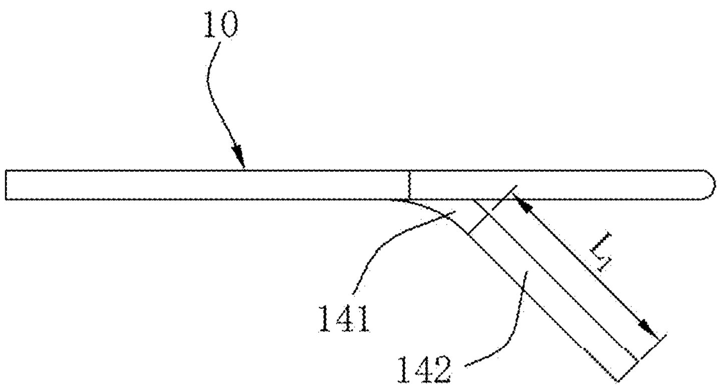
Figure 5:
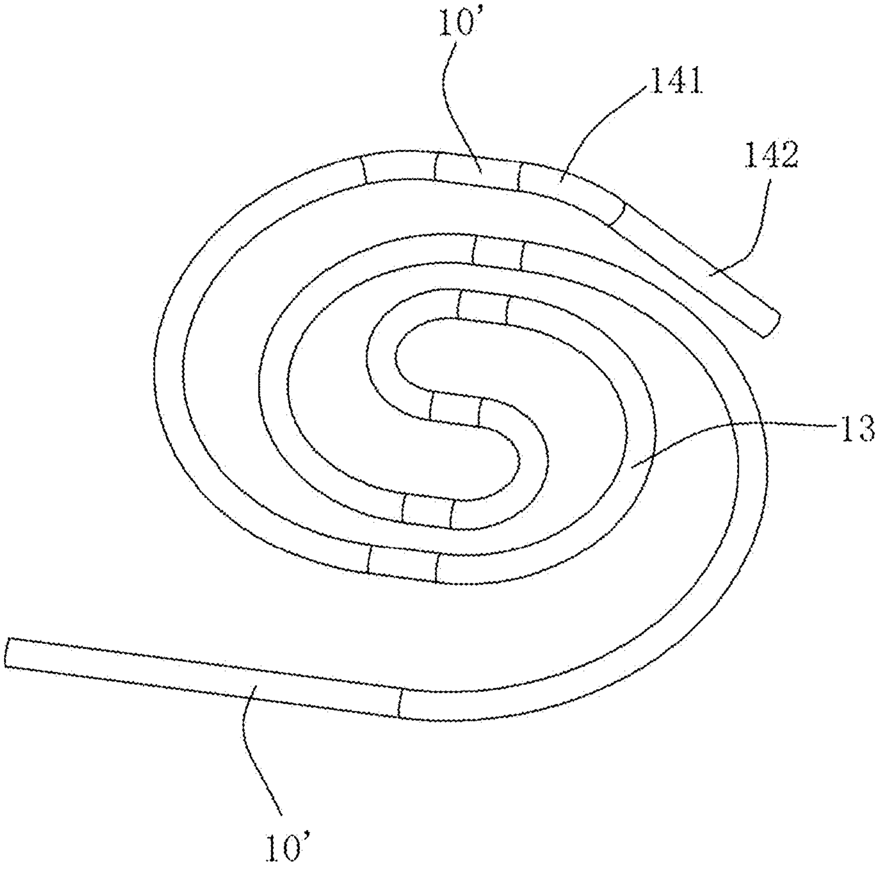
Figure 6:
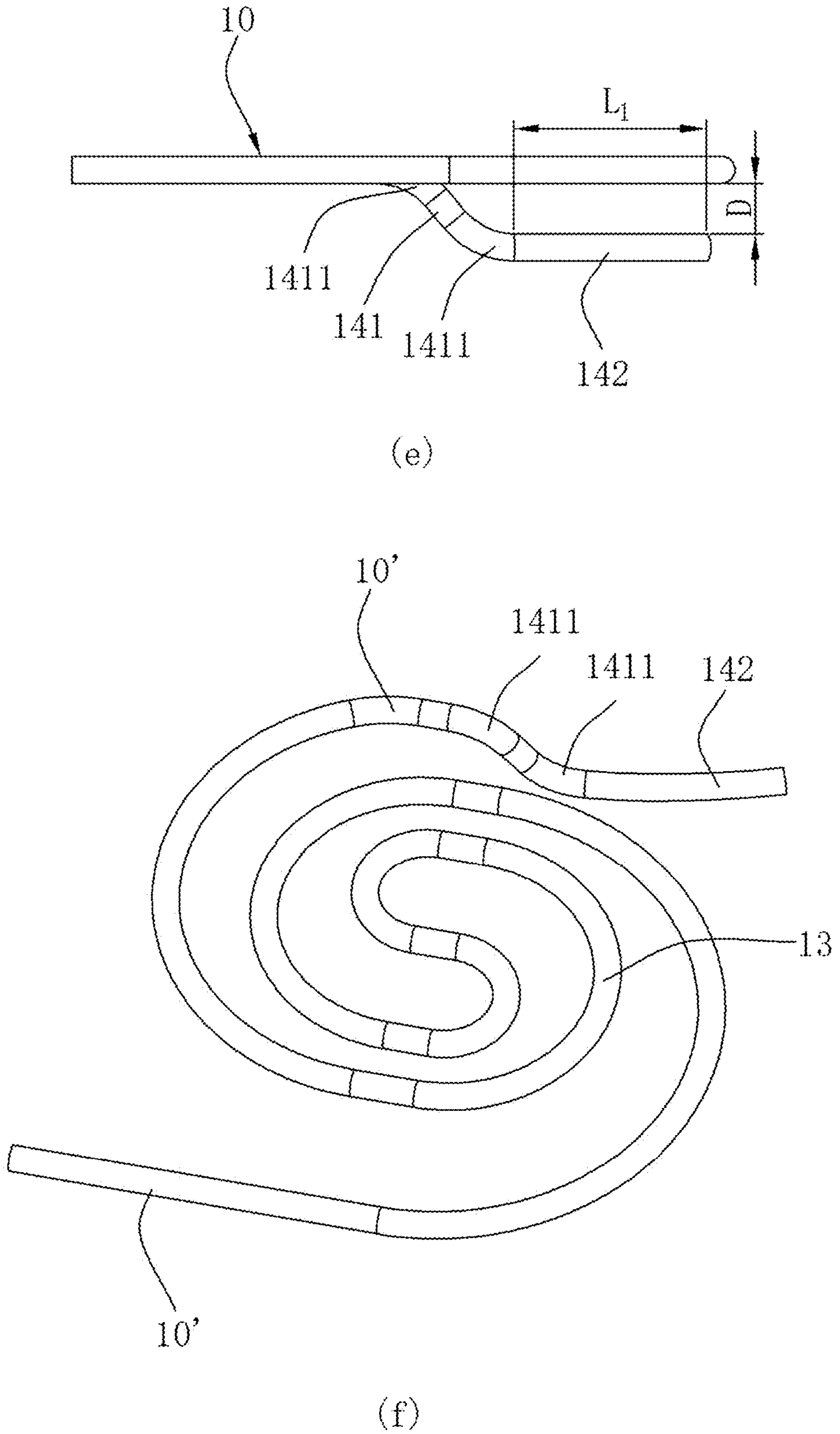
Figure 7:
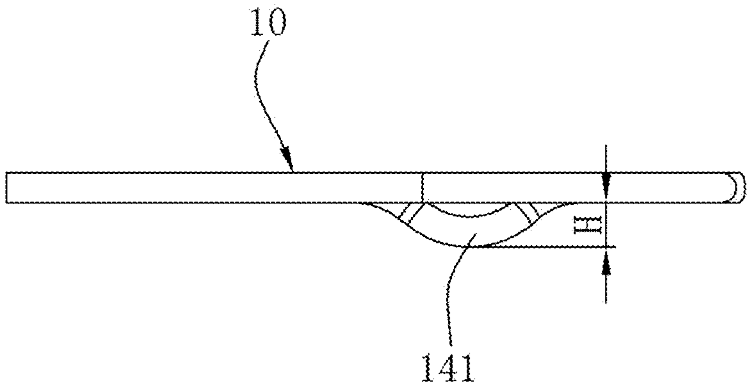
Figure 7:
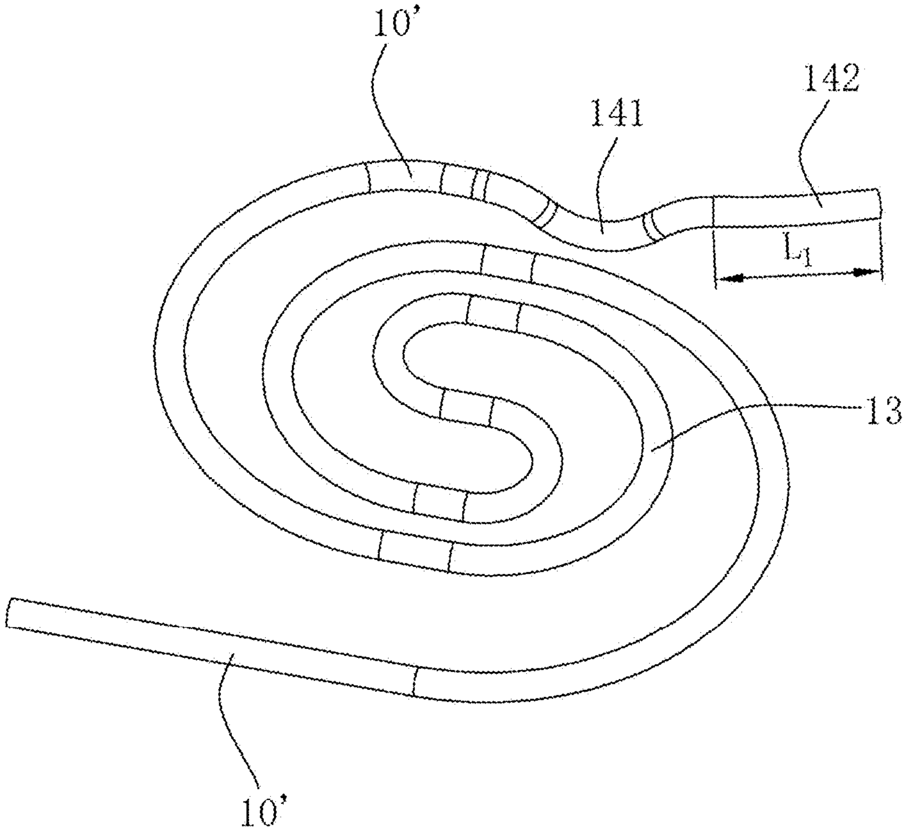
Figure 8:
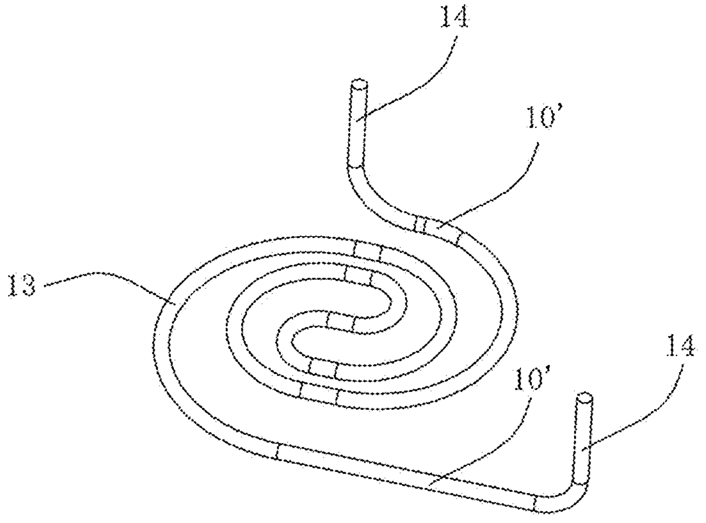
Figure 8:
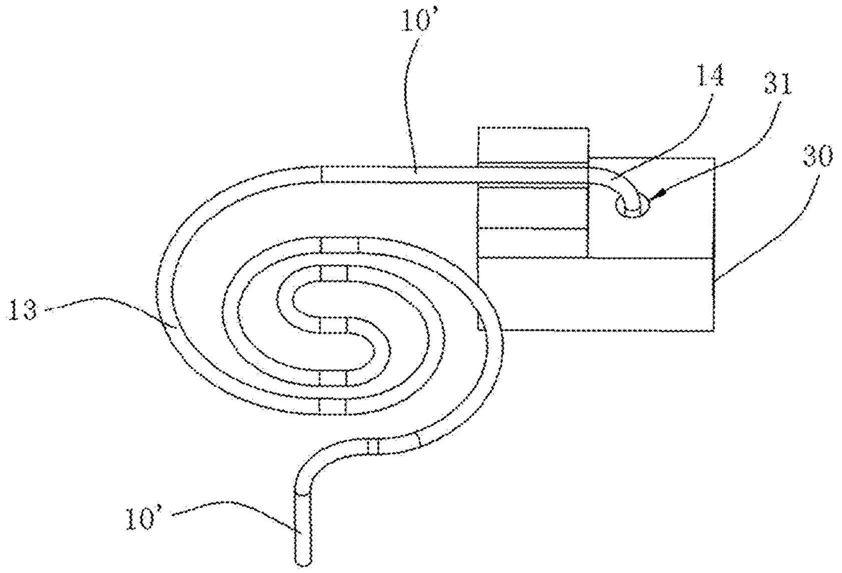
Figure 9:
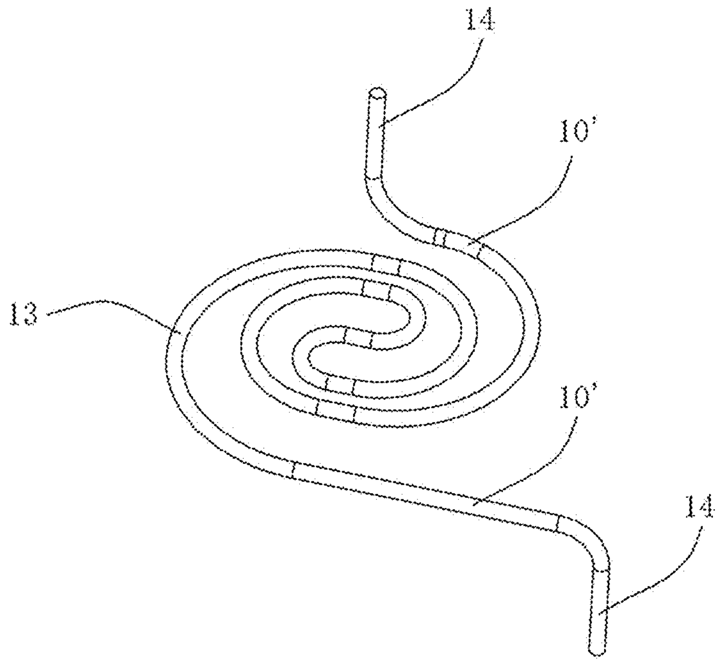
Figure 9:
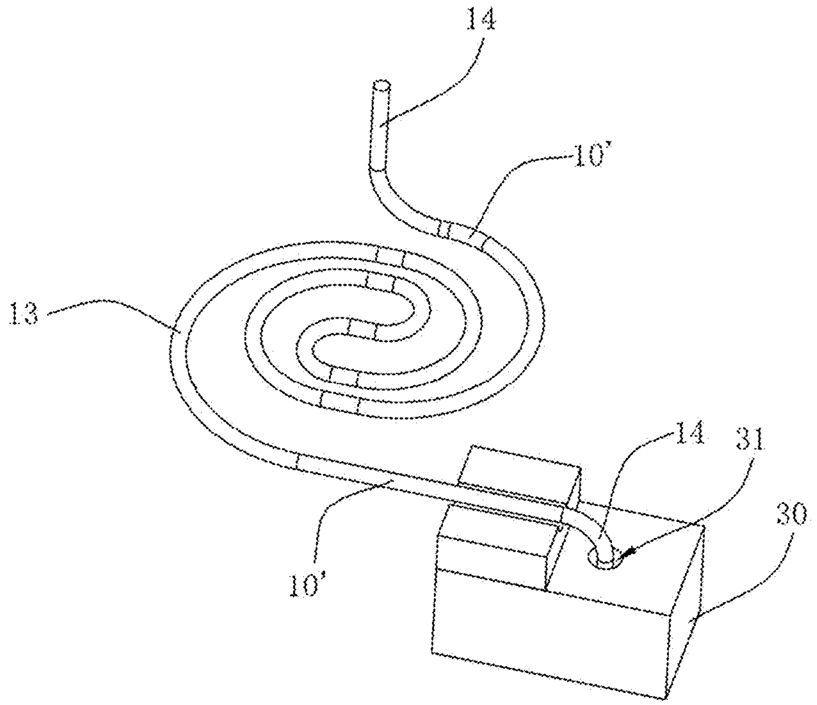
Figure 10:
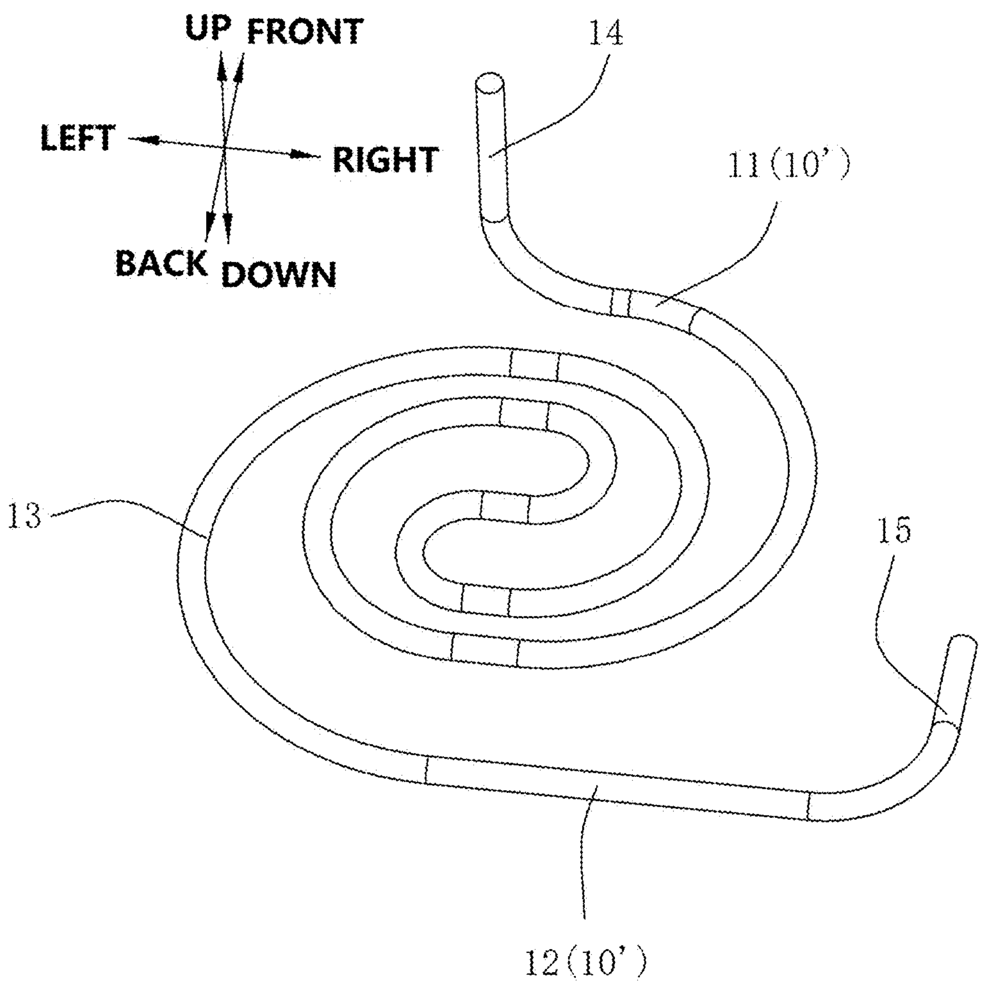
Figure 11:
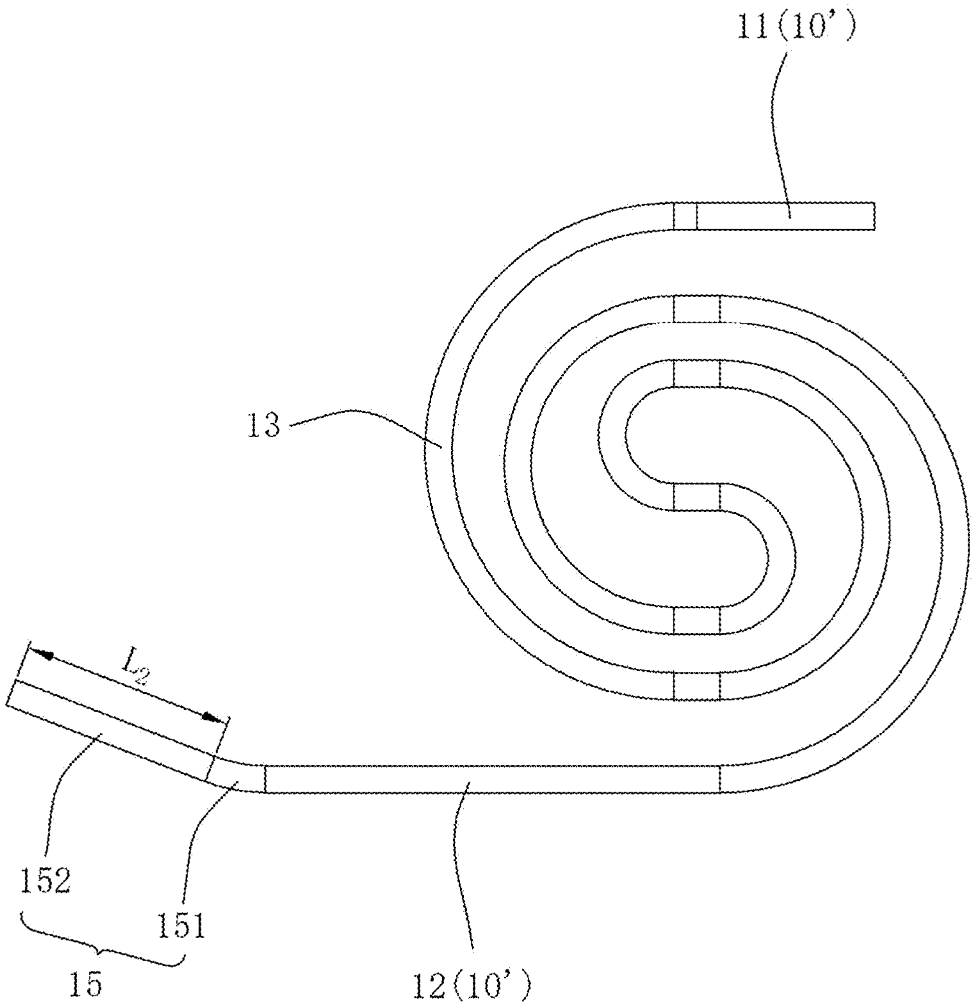
Figure 12:
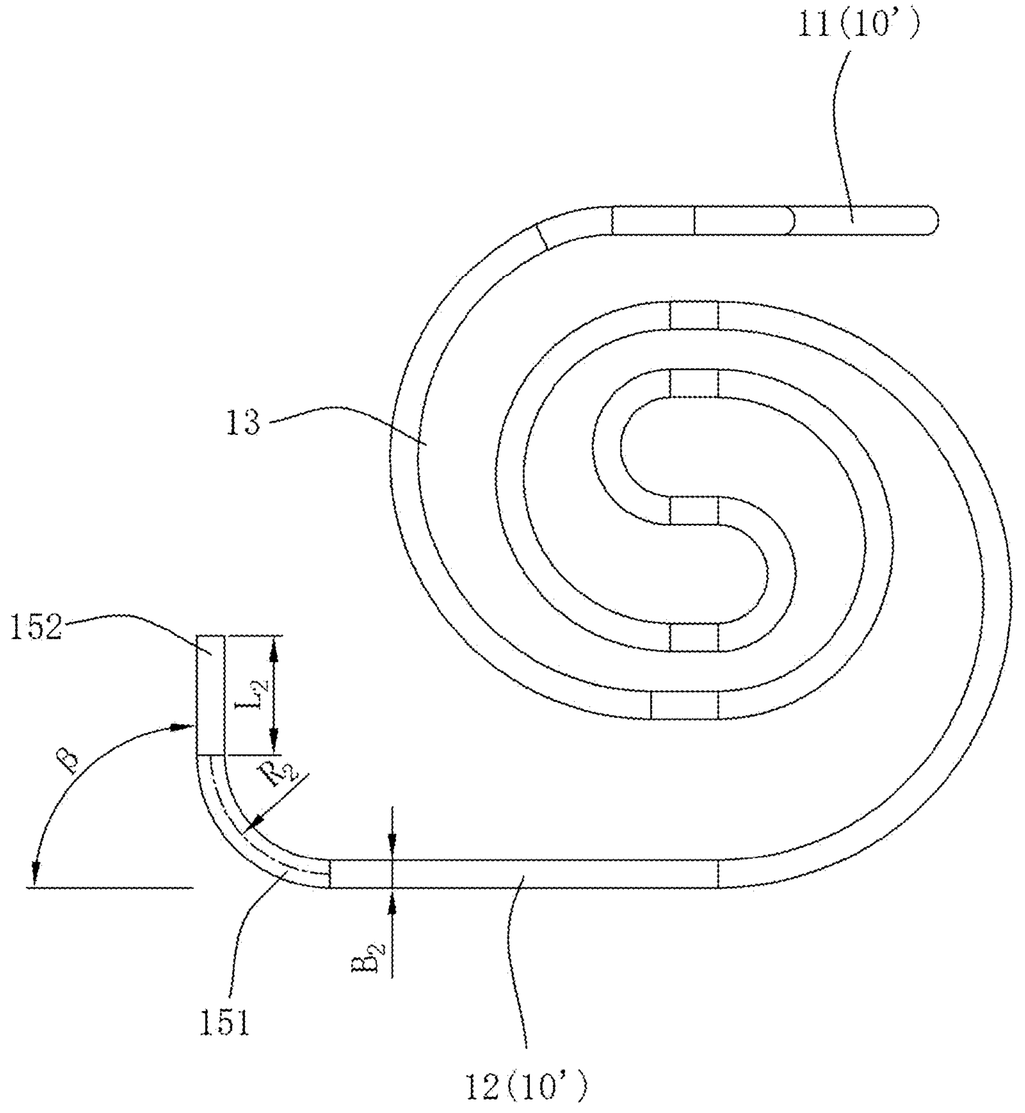
Figure 13:
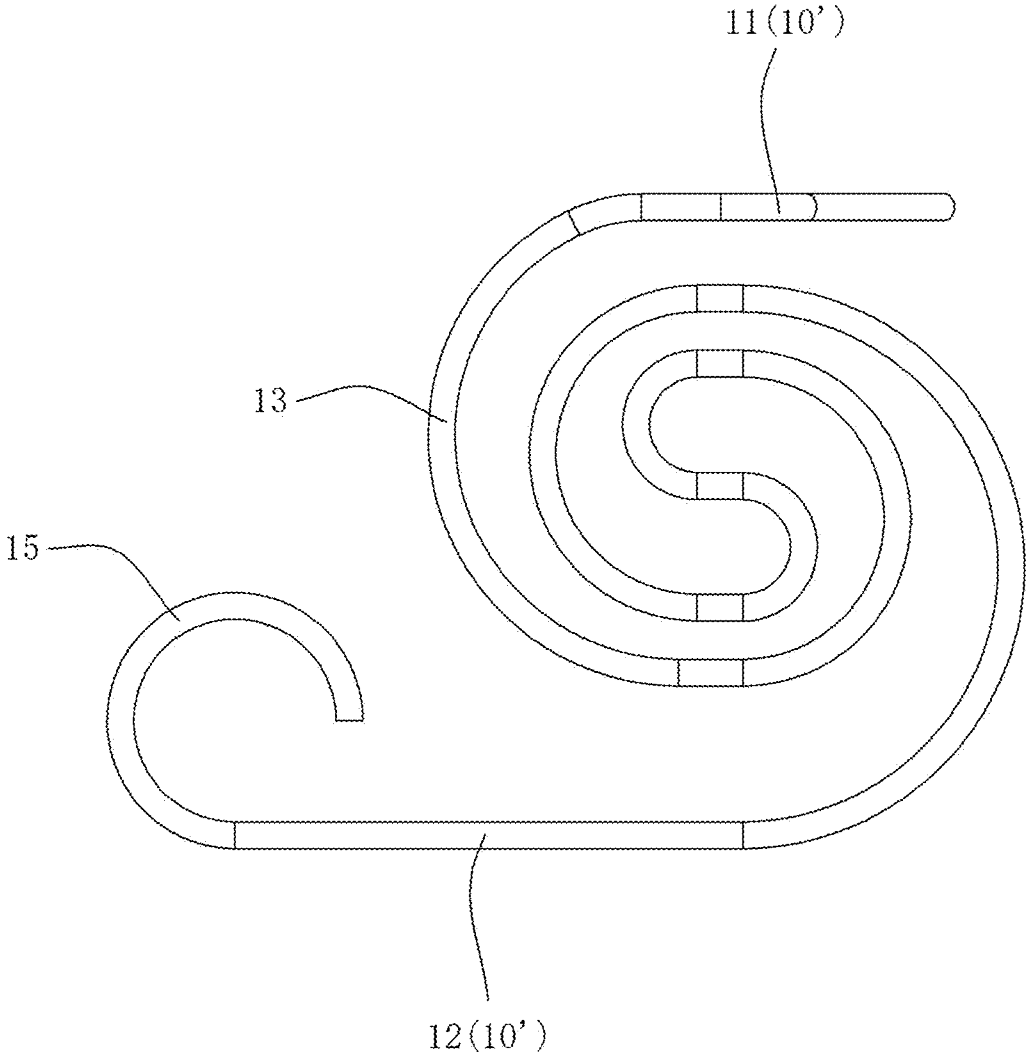

(a) in FIG. 4 is a front schematic diagram of an elastic support of an embodiment of the present disclosure, and (b) is a top schematic diagram of an elastic support of an embodiment of the present disclosure;

(c) in FIG. 5 is a front schematic diagram of an elastic support of another embodiment of the present disclosure, and (d) is a perspective schematic diagram of an elastic support of another embodiment of the present disclosure;

(e) in FIG. 6 is a front schematic diagram of an elastic support of yet another embodiment of the present disclosure, and (f) is a perspective schematic diagram of an elastic support of yet another embodiment of the present disclosure;

(g) in FIG. 7 is a front schematic diagram of an elastic support of yet another embodiment of the present disclosure, and (h) is a perspective schematic diagram of an elastic support of yet another embodiment of the present disclosure;

(i) in FIG. 8 is a perspective schematic diagram of an elastic support of an embodiment of the present disclosure, and (j) is a perspective assembly schematic diagram of an elastic support and a bracket of an embodiment of the present disclosure;

(k) in FIG. 9 is a perspective schematic diagram of an elastic support of another embodiment of the present disclosure, and (m) is a perspective assembly schematic diagram of an elastic support and a bracket of another embodiment of the present disclosure;

FIG. 10 is a perspective schematic diagram of an elastic support of yet another embodiment of the present disclosure;

FIG. 11 is a top schematic diagram of an elastic support of an embodiment of the present disclosure based on FIG. 10;

FIG. 12 is a top schematic diagram of an elastic support of another embodiment of the present disclosure based on FIG. 10;

FIG. 13 is a top schematic diagram of an elastic support of yet another embodiment of the present disclosure based on FIG. 10

Figure 14:
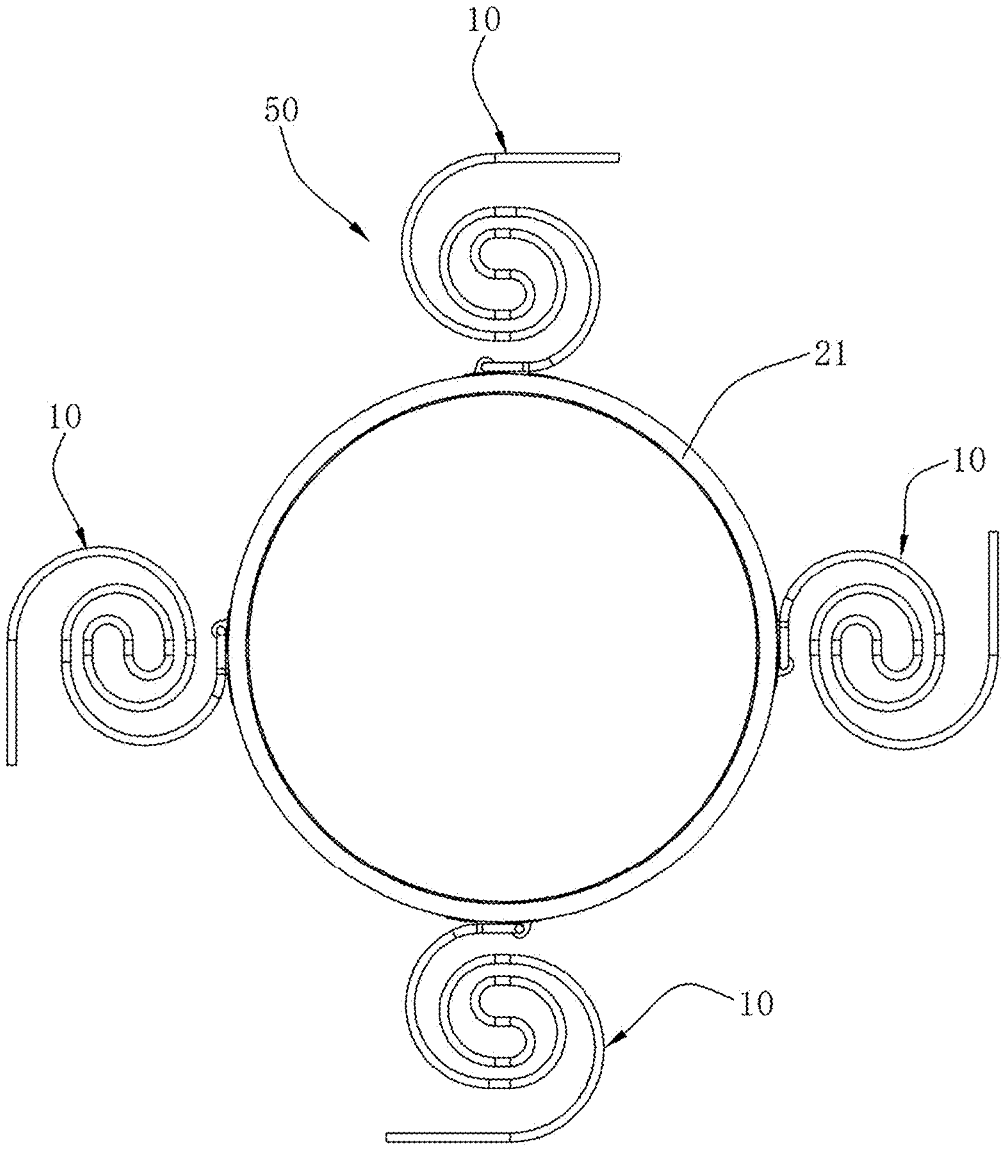

FIG. 14 is a top schematic diagram of an electronic device of the present disclosure.

DESCRIPTION OF REFERENCE SIGNS

| Number | Name | Number | Name |
|---|---|---|---|
| 10 | elastic support | 151 | second arc segment |
| 10' | installation part | 152 | second connection segment |
| 11 | first installation part | 20 | vibration unit |
| 12 | second installation part | 21 | voice coil |
| 13 | elastic part | 211 | bobbin |
| 14 | first cushioning part | 212 | voice coil wire |
| 141 | first arc segment | 30 | bracket |
| 1411 | corner | 31 | location hole |
| 142 | first connection segment | 40 | pad |
| 15 | second cushioning part | 50 | elastic group |

The realization of the objective, functional features and advantages of the present disclosure will be further described with reference to accompanying drawings in conjunction with embodiments.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, and not all of them. Based on the embodiments in the present disclosure, all other embodiments obtained by a person of ordinary skill in the art without making creative labor fall within the scope of protection of the present disclosure.

It should be noted that if embodiments of the present disclosure involve directional indications (such as up, down, left, right, forward, backward . . . ), the directional indications are used only to explain the relative position relationship, movement, etc. between components in a particular attitude (as shown in the figures), and if the particular attitude is changed, the directional indications are changed accordingly.

Further, if embodiments of the present disclosure relate to the description of "first", "second", etc., the description of "first", "second", etc. is for descriptive purposes only and cannot be understood as indicating or implying its relative importance or implicitly indicating the number of technical features indicated. Thus, features qualified with "first" and "second" may explicitly or implicitly include at least one such feature. In addition, the technical solutions of individual embodiments may be combined with each other, but only on the basis that the person of ordinary skill in the art can achieve, and when the combination of technical solutions is contradictory or unachievable, it should be considered that such combination of technical solutions does not exist and is not within the scope of protection of the claims of the present disclosure.

Figure 1:
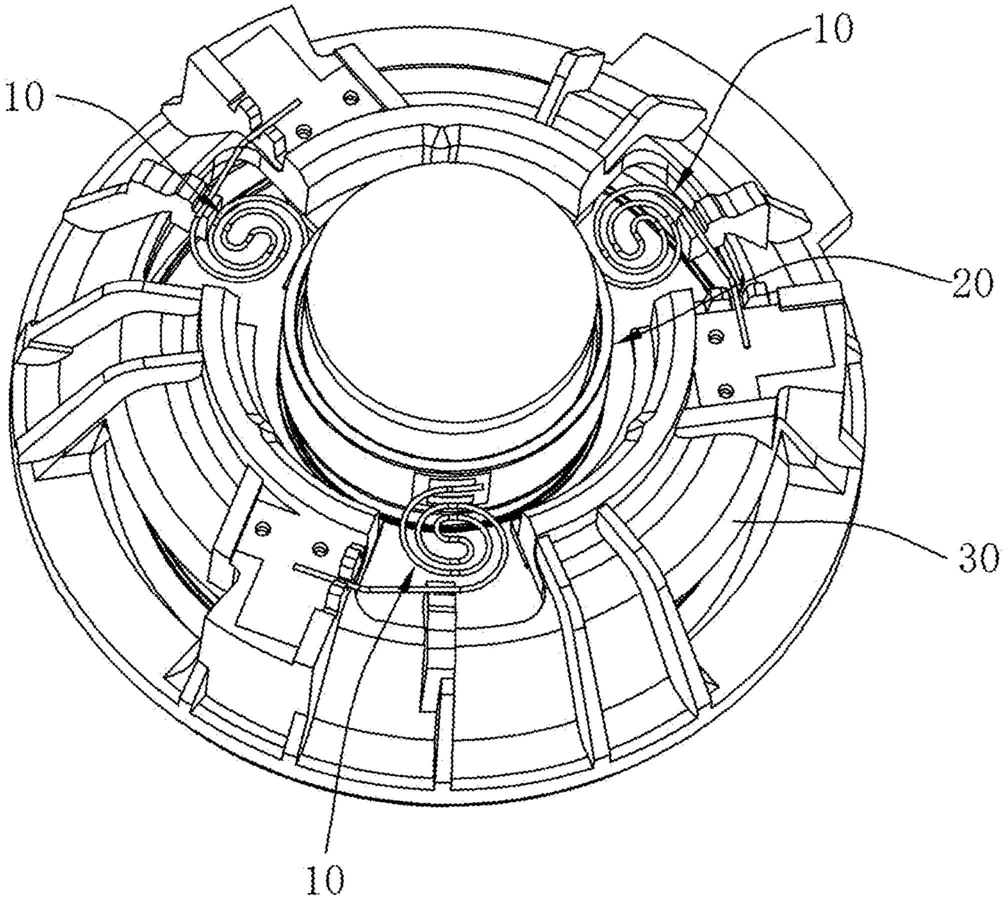
FIG. 1 is a perspective schematic diagram of an electronic device of an embodiment of the present disclosure.
Figure 2:
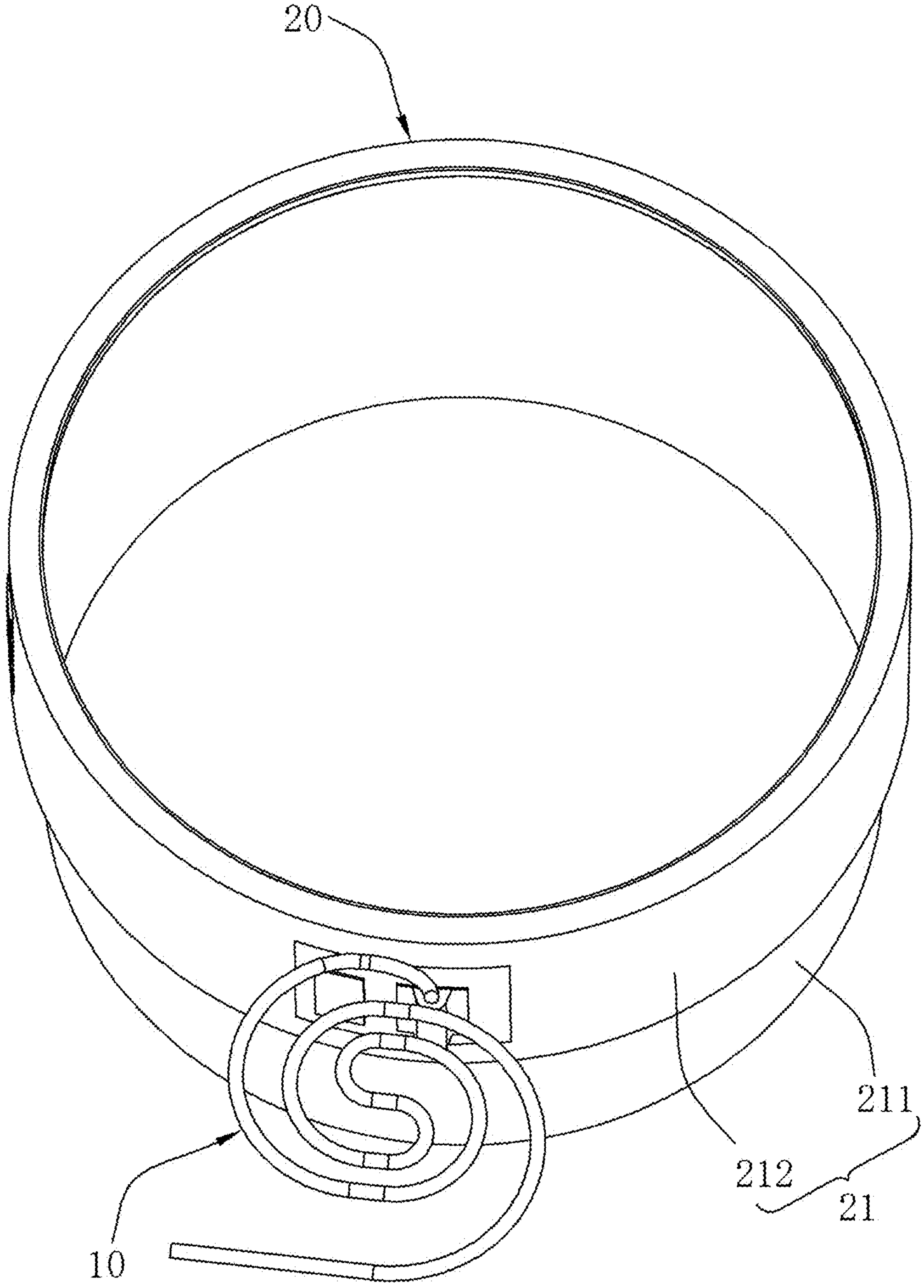
FIG. 2 is a perspective schematic diagram of an elastic support and a voice coil of an embodiment of the present disclosure.
Figure 3:
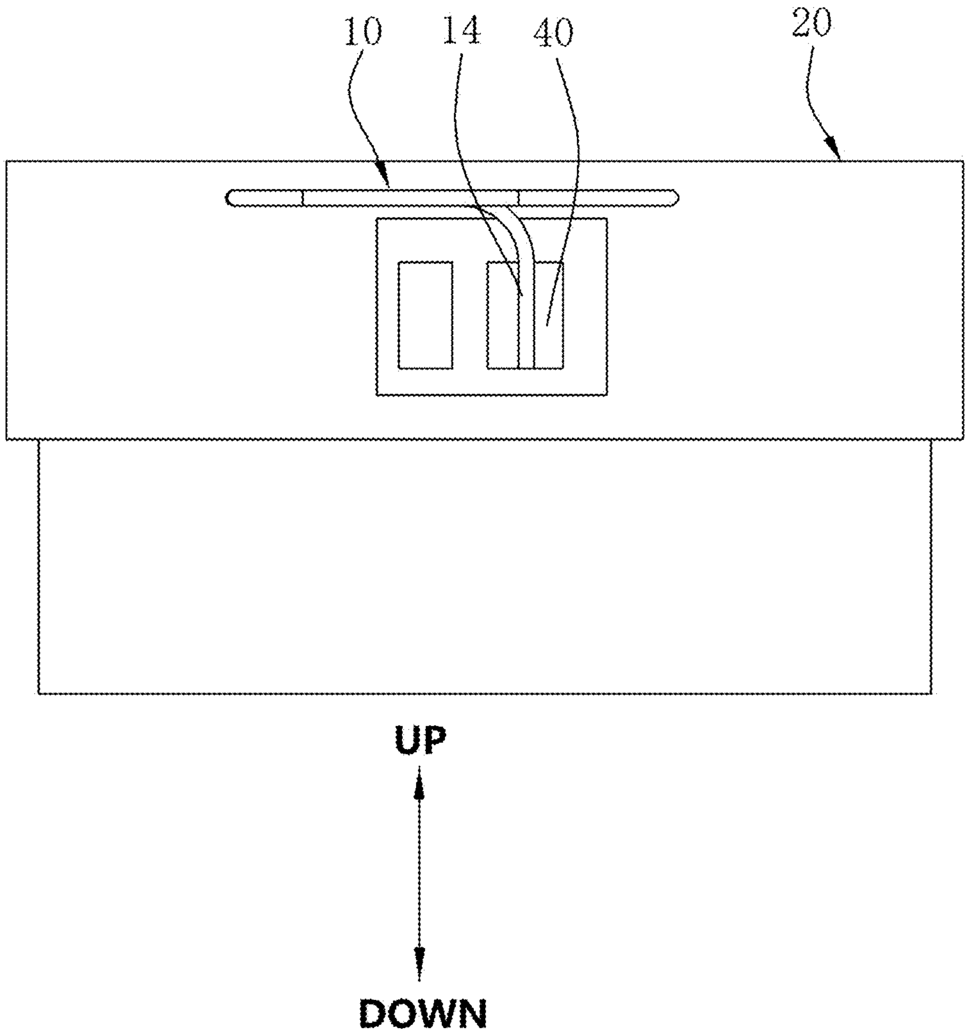
FIG. 3 is a front schematic diagram of an elastic support and a voice coil of an embodiment of the present disclosure.

The orientation descriptions of "up", "down", "front", "back", "left", "right", etc. in the present disclosure are based on the orientations shown in FIG. 3 and FIG. 10 and are used only to explain the relative positions of the components in the attitudes shown in FIG. 3 and FIG. 10, and if that particular attitude changes, the directional indications change accordingly.

The present disclosure proposes an elastic support.

As shown in FIGS. 1 to 14, in the present embodiment, the elastic support 10 comprises two installation parts 10' and an elastic part 13 connected between two installation parts 10', the elastic part 13 is in a polyline structure consisting of straight lines and/or curves, and one end of each installation part 10' away from the elastic part 13 is connected with a stationary component or a component that reciprocatively vibrates in a first direction; at least one of the installation part 10' is provided with a first cushioning part 14, at least partial structure of which first cushioning part 14 is bent from the end of the installation part 10' away from the elastic part 13 toward the first direction.

The elastic support 10 of the present embodiment is applied to an electronic device such as a sound production device, a motor, or a multifunctional vibration device. The present embodiment is illustrated by the application of the elastic support 10 to the sound production device. The electronic device includes an elastic support 10 and a vibration unit 20, and the elastic support 10 is used to counterbalance the vibration of the vibration unit 20 in a first direction. The first direction in the present embodiment is the up-down direction shown in FIG. 3 and FIG. 10, i.e., the elastic support 10 is used to counterbalance the vibration of the vibration unit 20 in the up-down direction. The electronic device also includes a bracket 30. In one embodiment, the vibration unit 20 includes a diaphragm and a voice coil 21 connected with the diaphragm; the two installation parts 10' of the elastic support 10 are each connected with the voice coil 21. In one embodiment, the vibration unit 20 includes a diaphragm and a voice coil 21 connected with the diaphragm; the two installation parts 10' of the elastic support 10 are correspondingly connected with the voice coil 21 and the bracket 30, and/or the bracket 30 is a housing or a magnetic yoke.

It can be understood that after the vibration unit 20 is energized, it can vibrate in the up-down direction within the housing of the electronic device after the electrical signal is turned on, wherein the up-down direction is as shown in FIG. 3 and FIG. 10, the vibrating direction of the vibration unit 20 is indicated by the vertical direction or the up-down direction, and the direction perpendicular to the vibration of the vibration unit 20 is indicated by the horizontal direction. In one embodiment, one installation part 10' of the elastic support 10 is connected with the voice coil 21. Specifically, the voice coil 21 includes a bobbin 211 and a voice coil wire 212 wound around the bobbin 211. The installation part 10' may be connected with the bobbin 211 or with the voice coil wire 212. The other installation part 10' of the elastic support 10 is connected with the housing, therefore achieving the assembly of the voice coil 21, the elastic support 10, and the housing. In another embodiment, one installation part 10' of the elastic support 10 is connected with the voice coil 21, and the other installation part 10' is connected with the yoke.

In the electronic device, the vibration unit 20 comprises the diaphragm and the voice coil 21 connected with the diaphragm, and the voice coil 21 is generally formed by winding a metal wire. After the voice coil 21 is energized, it vibrates up and down due to the ampere force in the magnetic field of the electronic device, and the vibrating direction of the voice coil 21 is indicated by the vertical direction or the up-down direction, and the direction perpendicular to the vibration of the voice coil 21 is indicated by the left-right direction or the horizontal direction. Since the diaphragm and the voice coil 21 are fixed and integrated by means of adhesion or the like, when the voice coil 21 vibrates up and down according to an electric signal, the diaphragm is also driven to vibrate, thereby generating a sound wave.

Since the magnetic field of the electronic device is relatively uniform but not absolute, the position of the voice coil 21 also changes during vibration, and magnetic induction lines on the upper side of a magnetic gap of the electronic device are arc-shaped lines. Therefore, the ampere force applied to the voice coil 21 is not only in the vertical direction, but also in other directions, which makes the voice coil 21 prone to non-vertical polarization during vibration and further affects the vibration of the diaphragm.

In order to prevent occurrence of the above polarization, the elastic support 10 provided for connecting between the voice coil 21 and the bracket 30 may perform centering support on the polarization of the voice coil 21, that is, to ensure that the voice coil 21 vibrates in the vibration direction within the magnetic gap of the electronic device. In one embodiment, the elastic support 10 is a damper or a planar spring.

In one embodiment, the bracket 30 is a housing or a magnetic yoke. Since the housing may be used to bear the sound production device monomer, it is possible to facilitate the fixing of the elastic support 10 on the side away from the vibration unit 20, thereby improving the effect on the centering support of the elastic support 10. Since most of the vibration unit 20 is close to the magnetic gap of the electronic device and close to the yoke, by connecting the side of the elastic support 10 away from the vibration unit 20 to the yoke, it is possible to save the setup distance of the elastic support 10 and facilitate the improvement of effect on the centering support of the elastic support 10. It should be noted that, as described above, the elastic support 10 of the present embodiment is fixed in various combinations: two installation parts 10' of the elastic support 10 are respectively connected with the voice coil 21 and the housing;

alternatively, the two installation parts 10' of the elastic support 10 are respectively connected with the voice coil 21 and the yoke, which may better ensure the centering support performance of the elastic support 10.

The elastic support 10 of the present embodiment includes the two installation parts 10' and an elastic part 13 connected between the two installation parts 10', and the clastic part 13 is in a polyline structure consisting of straight lines and/or curves. Specifically, the elastic support 10 may be in a linear, strip-shaped, or sheet-shaped polyline structure formed by integrally stamping a metal plate, or in a polyline structure formed by winding a single-strand metal wire, or in a polyline structure formed by winding a double-strand metal wire. The shape of the elastic part 13 may be a polygonal spiral structure formed by bending and extending a line-like structure, and specifically, may be a quadrangle, a pentagon, a hexagon, etc., or a circular or elliptical structure, or a structure combining straight lines and curves. For example, each bending in the elastic part 13 is a bending segment, a part of which is a straight line, and the other part of which is a curve. Specifically, it may be a shape in which curves and straight lines are alternately connected. It should be noted that the alternation here is not limited to one-to-one alternation, but may also be one-to-many or many-to-many alternation.

By the arrangement of the elastic support 10 of the present embodiment, it is possible to restrain the vibration unit 20 in the horizontal direction to restrain the vibration unit 20 from polarizing while the vibration unit 20 is vibrating vertically, and the elastic support 10 follows displacement of the vibration unit 20 in the vertical direction. Compared with the existing corrugated sheet-shaped damper, the elastic part 13 of the elastic support 10 in this embodiment extends in straight lines and/or curves, which reduces the stress concentration in the elastic part 13, increases the fatigue strength, and reduces the risk of fracture of the elastic support 10, such that during the displacement of the elastic support 10 following the vibration unit 20 in the vertical direction, the elastic part 13 deforms elastically enough, and even when the vibration displacement of the vibration unit 20 is large, the elastic support 10 maintains good compliance and can provide sufficient displacement, thus not affecting the vibration of the vibration unit 20, and optimizing the product performance. In addition, the elastic support 10 in this embodiment is formed by bending and extending a line-like structure on the whole, and is simple and convenient to manufacture, which simplifies the manufacturing process, has high manufacturing efficiency and reduces the manufacturing cost. In addition, the elastic support 10 in this embodiment does not increase the height of the electronic device in the vertical direction, which occupies small space and is beneficial to miniaturization of the product.

In addition, in the elastic support 10 in this embodiment, at least one installation part 10' is provided with a first cushioning part 14, and at least partial structure of the first cushioning part 14 is bent toward the first direction from the end of the installation part 10' away from the elastic part 13. It can be understood that when the elastic support 10 is assembled with the voice coil 21 and the bracket 30 such as the housing or the yoke, the first cushioning part 14 of the elastic support 10 may be in contact with the voice coil 21 or the pad 40 of the bracket 30, is coated with solder paste, and the paste is melted by laser soldering to fix the elastic support 10 to the pad 40, therefore achieving assembly of the elastic support 10 and the voice coil 21 or the bracket 30. While in the elastic support 10 in this embodiment, at least partial structure of the first cushioning part 14 is bent in a direction consistent with the vibration direction of the vibration unit 20, that is, at least partial structure of the first cushioning part 14 is bent in the vertical direction, such that at least partial structure of the first cushioning part 14 is not affected by the vertical vibrations of the vibration unit 20, and thus the partial structure will not be pulled by the rotary force, has good fatigue resistance, is not prone to the fracture and detachment of the solder joints of the elastic support 10 and the pad 40, therefore guaranteeing efficient and highly reliable assembly between the elastic support 10 and the voice coil 21 or bracket 30.

In the elastic support 10 of the present embodiment, the installation part 10' is in smooth transition connection with the first cushioning part 14, which reduces stress concentrations and ensures that the elastic support 10 does not fracture. Further, the first cushioning part 14 comprises a first connection segment 142 and a first arc segment 141, the first connection segment 142 is connected with a component reciprocating in the first direction, and the first connection segment 142 is in smooth transition connection with the installation part 10' through the first arc segment 141. Specifically, the first connection segment 142 is connected to the vibration unit 20 and specifically may be connected to the voice coil 21. The first connection segment 142 is in smooth transition connection with the installation part 10' through the first arc segment 141, and the first arc segment 141 acts as a cushioning between the installation part 10' and the first connection segment 142, thus avoiding stress concentration.

The elastic part 13 is a planar structure arranged in a second direction, and is located in the same horizontal plane as the two installation parts 10', and the first direction and the second direction are perpendicular to each other. The second direction of the present embodiment is a horizontal direction or left-right direction as shown in FIG. 10. The elastic part 13 is in a planar structure arranged horizontally, and is located in the same horizontal plane as the two installation parts 10', that is, the elastic part 13 and the two installation parts 10' both are in a planar structure arranged horizontally. Compared with the existing corrugated sheet-shaped damper, the present embodiment improves the overall flatness of the elastic support 10, further reduces the height of the electronic device along the vertical direction, and realizes the design concept of product miniaturization.

As shown in FIGS. 4 and 5, in one embodiment, the first arc segment 141 is a circular arc segment whose inner concave surface is disposed facing away from the elastic part 13, and the first connection segment 142 is a straight segment forming an angle of 20°~160° with the clastic part 13. As shown in FIGS. 4 and 5, the inner concave surface of the first arc segment 141 is set downward, and the first connection segment 142 is a straight segment, which is convenient to connecting with the voice coil 21 or bracket 30. Further, the first connection segment 142 forms an angle $\alpha$ with the elastic part 13, wherein $\alpha$=20°~160°. Since the elastic part 13 is arranged horizontally, the first connection segment 142 forms an angle $\alpha$ with the horizontal plane. With the setup of the first arc segment 141, the angle between the first connection segment 142 and the elastic part 13 is 20°~160°, which may appropriately suppress the traction of the elastic support 10 by the rotary force, and in turn may appropriately reduce the influence of the elastic support 10 by the vertical vibration of the vibration unit 20. In addition, the first arc segment 141 and the first connection segment 142 are respectively set as a circular arc segment and a straight segment, which is convenient for manufacturing.

Further, the first connection segment 142 forms an angle of 45°~95° with the elastic part 13; and/or, the first connection segment 142 has a length greater than or equal to 1.5 mm. The angle between the first connection segment 142 and the elastic part 13 is set as 45°~95°, that is, $\alpha$=45°~95°, which may greatly reduce the influence of the vertical vibration of the vibration unit 20 on the elastic support 10, thereby improving the reliability. The first connection segment 142 has a length greater than or equal to 1.5 mm, and as shown in FIGS. 4 and 5, the length of the first connecting segment 142 is represented by $L_1$, wherein $L_1 \geq 1.5$ mm, such that the first connection segment 142 has sufficient length to allow soldering and securing to the pad 40. As shown in FIG. 4, in one embodiment, the angle between the first connection segment 142 and the elastic part 13 is $\alpha$=90°, as shown in FIG. 5, and in another embodiment, the angle between the first connection segment 142 and the elastic part 13 is $\alpha$=45°.

As shown in FIG. 6, and yet another embodiment, the first arc segment 141 is provided in a Z shape, the first connection segment 142 is a straight segment provided at a distance from the elastic part 13, and the first connection segment 142 and the elastic part 13 are set parallel to each other. Further, the first arc segment 141 comprises two corners 1411, the corner 1411 connected with the installation part 10' is a circular arc segment whose inner concave surface is disposed facing away from the elastic part 13, and the corner 1411 connected with the first connection segment 142 is a circular arc segment whose inner concave surface is disposed facing toward the elastic part 13. As shown in FIG. 6, in the first arc segment 141, the inner concave surface of the corner 1411 connected with the installation part 10' is downward, the inner concave surface of the corner 1411 connected with the first connection segment 142 is upward, and the first connection segment 142 as a whole presents a Z-shaped structure with a circular arc segment at the corner 1411. By so setting, it is possible to greatly suppress the elastic support 10 from being pulled by the rotary force, and thus reduce the influence of the vertical vibration of the vibration unit 20 on the elastic support 10. In addition, the elastic part 13 and the first connection segment 142 are vertically spaced and parallel to each other, and the first connection segment 142 is a horizontally arranged straight segment, which facilitates soldering and fixing to the pad 40.

Further, a distance between the first connection segment 142 and the elastic part 13 is greater than or equal to 0.5 mm; and/or, the first connection segment 142 has a length greater than or equal to 1.5 mm. As shown in FIG. 6, the distance between the first connection segment 142 and the elastic part 13 is represented by D, wherein D≥0.5 mm, that is, it is possible to both secure the compactness of the entire structure of the elastic support 10 and achieve the effectiveness of suppressing the elastic support 10 from being pulled by the rotary force to a large extent. In addition, the first connection segment 142 has a length greater than or equal to 1.5 mm, and the length of the first connecting segment 142 is represented by $L_1$, wherein $L_1 \geq 1.5$ mm, such that the first connection segment 142 has sufficient length to allow soldering and securing to the pad 40.

As shown in FIG. 7, in another embodiment, the first arc segment 141 is a semi-circular arc segment whose inner concave surface is disposed facing toward the elastic part 13, and the first connection segment 142 is a straight segment and is located in the same horizontal plane as the elastic part 13. As shown in FIG. 7, the inner concave surface of the semi-circular arc segment is upward, and the semi-circular arc segment can greatly inhibit the elastic support 10 from being pulled by the rotary force, thereby reducing the influence of the vertical vibration of the vibration unit 20 on the elastic support 10. In addition, the first connection segment 142 is a straight segment and is located in the same horizontal plane as the elastic part 13, which not only facilitates the fabrication, but also maximizes the compactness of the overall structure of the elastic support 10.

Further, a distance between the first arc segment 141 and the elastic part 13 is greater than or equal to 0.5 mm; and/or, the first connection segment 142 has a length greater than or equal to 1.5 mm. As shown in FIG. 7, the maximum distance between the first arc segment 141 and the elastic part 13 is H, wherein H≥0.5 mm, that is, it is possible to both secure the compactness of the entire structure of the elastic support 10 and achieve the effectiveness of suppressing the elastic support 10 from being pulled by the rotary force to a large extent. In addition, the first connection segment 142 has a length greater than or equal to 1.5 mm, and the length of the first connecting segment 142 is represented by $L_1$, wherein $L_1 \geq 1.5$ mm, such that the first connection segment 142 has sufficient length to be soldered and fixed with the pad 40.

It should be noted that, in other embodiments, the first cushioning part 14 may also be other structures bent in the up-down direction, and the shape and structure of the first cushioning part 14 are not limited by the elastic support 10 of the present disclosure.

In the present embodiment, there is a distance R from a bending midline of the first arc segment 141 and a bending center of the first arc segment 141, and the first arc segment 141 has a cross section with a width B, wherein R≥2B, which may reduce the stress concentration at the bend of the first cushioning part 14, and reduce the risk of fracture of the elastic support 10.

Each of the two installation parts 10' of the elastic support 10 is provided with the first cushioning part 14, and two first cushioning parts 14 are of identical structures and are bent in the same direction or opposite directions.

As shown in FIG. 8, in one embodiment, each of the two installation parts 10' of the elastic support 10 is provided with the first cushioning part 14, and two first cushioning parts 14 are of identical structures and are bent in the same direction or opposite directions, that is, the two first cushioning parts 14 are both bent upward or downward. One of the first cushioning parts 14 may be connected with the pad 40 of the voice coil 21, and the other of the first cushioning parts 14 may be connected with the pad 40 of the bracket 30, such that at least partial structure of the two first cushioning parts 14 is not affected by the vertical vibration of the vibration unit 20, therefore further increasing the fatigue strength, and guaranteeing efficient and highly reliable assembly between the elastic support 10 and the voice coil 21 or bracket 30. In addition, the first cushioning part 14 connected with the bracket 30 may also be inserted upward or downward into the location hole 31 of the bracket 30, which serves as a coarse positioning during assembly of the elastic support 10 with the bracket 30.

As shown in FIG. 9, in another embodiment, each of the two installation parts 10' of the elastic support 10 is provided with the first cushioning part 14, and two first cushioning parts 14 are of identical structures and are bent in the same direction or opposite directions. That is, in two first cushioning parts 14, one of the two first cushioning parts 14 is bent upward, and the other of the two first cushioning parts 14 is bent downward. In addition, one of the first cushioning parts 14 may be connected with the pad 40 of the voice coil 21, and the other of the first cushioning parts 14 may be connected with the pad 40 of the bracket 30, such that at least partial structure of the two first cushioning parts 14 is not affected by the vertical vibration of the vibration unit 20, therefore further increasing the fatigue strength, and guaranteeing efficient and highly reliable assembly between the elastic support 10 and the voice coil 21 as well as the bracket 30. In addition, the first cushioning part 14 connected with the bracket 30 may also be inserted upward or downward into the location hole 31 of the bracket 30, which serves as a coarse positioning during assembly of the elastic support 10 with the bracket 30.

It can be understood that the two first cushioning parts 14 of the elastic support 10 are bent in the same direction or opposite directions, which is a practical choice based on the actual situation. The user may flexibly select different types of elastic support 10 depending on the actual situation, thus improving the case of use.

As shown in FIGS. 1-13, in yet another embodiment, the two installation parts 10' are respectively a first installation part 11 and a second installation part 12, wherein the first installation part 11 is provided with the first cushioning part 14, the second installation part 12 is provided with the second cushioning part 15, the second cushioning part 15 is located in the same horizontal plane as the elastic part 13, and the second cushioning part 15 is bent toward or away from the elastic part 13 from an end of the second installation part 12 which is away from the elastic part 13. In elastic support 10 of the present embodiment, the first cushioning part 14 provided on the first installation part 11 is bent upward or downward, and the second cushioning part 15 is located in the same horizontal plane as the elastic part 13, that is, the second cushioning part 15 is arranged horizontally, and is bent toward or away from the elastic part 13.

The specific structure of the first cushioning part 14 is described with reference to the above embodiment. Since the elastic support 10 adopts all the technical solutions of the above related embodiments, it at least has all the beneficial effects brought by the technical solutions of the above related embodiments, which will not be repeated herein. As shown in FIGS. 10-13, the elastic part 13 is located in a middle section between the first installation part 11 and the second installation part 12, and the second cushioning part 15 of the present embodiment is bent toward or away from the elastic part 13, that is, the second cushioning part 15 is bent toward or away from the middle section of the elastic support 10. Preferably, the second cushioning part 15 is bent toward the middle section of the elastic support 10, which not only increases the contact area between the second cushioning part 15 and the pad 40 of the bracket 30, but also suppresses the rotary force applied to the elastic support 10 when the vibration unit 20 vibrates, therefore providing good fatigue resistance, not being prone to the fracture and detachment of the solder joints of the elastic support 10 and the pad 40 of the bracket 30, and guaranteeing efficient and highly reliable assembly between the elastic support 10 and the bracket 30.

Specifically, as shown in FIG. 13, in one embodiment, the second cushioning part 15 is an arc segment, one end of which is connected with a stationary component or a component that reciprocatively vibrates in the first direction, and the other end of which is in smooth transition connection with the second installation part 12. The present embodiment is illustrated with the second cushioning part 15 connected to the bracket 30 as an example. The second cushioning part 15 is the arc segment, one end of which is connected with the bracket 30, and the other end of which is in smooth transition connection with the second installation part 12, which reduces stress concentrations and ensures that the elastic support 10 does not fracture.

Further, the second cushioning part 15 is circular arc segment with a central angle larger than or equal to 90°; and/or, the second cushioning part 15 has a length larger than or equal to 1.5 mm. As shown in FIG. 13, the second cushioning part 15 may be ¾ arc-shaped, which may greatly reduce the influence of the vertical vibration of the vibration unit 20 on the elastic support 10. In addition, the second cushioning part 15 has a length larger than or equal to 1.5 mm, such that the second cushioning part 15 has sufficient length to be soldered and fixed with the pad 40.

As shown in FIGS. 11 and 12, in another embodiment, the second cushioning part 15 comprises a second connection segment 152 and a second arc segment 151, the second connection segment 152 is connected with a stationary component or a component that reciprocatively vibrates in the first direction, and the second connection segment 152 is in smooth transition connection with the second installation part 12 through the second arc segment 151. The present embodiment is illustrated with the second cushioning part 15 connected to the bracket 30 as an example, the second connection segment 152 of the second cushioning part 15 is connected with the bracket 30, and the second connection segment 152 is in smooth transition connection with the second installation part 12 through the second arc segment 151, and the second arc segment 151 acts as a cushioning between the second installation part 12 and the second connection segment 152, thus avoiding stress concentration.

Further, the second arc segment 151 is a circular arc segment whose inner concave surface is provided toward the elastic part 13, and the second connection segment 152 is a straight segment forming an angle of 15°~160° with an extension line of the second installation part 12. As shown in FIGS. 11 and 12, the inner concave surface of the second arc segment 151 is arranged forward, and the second connection segment 152 is a straight segment, which is convenient for connection with the bracket 30. In addition, there is an angle β between the second connection segment 152 and the elastic part 13, β=15°~160°. With the setup of the second arc segment 151, the angle between the second connection segment 152 and an extension line of the second installation part 12 is 15°~160°, which may appropriately suppress the elastic support 10 from being pulled by the rotary force, and thus may appropriately reduce the influence of the vertical vibration of the vibration unit 20 on the elastic support 10. In addition, the second arc segment 151 and the second connection segment 152 are set as a circular arc segment and a straight segment, respectively, which is convenient to manufacture.

Further, the angle between the second connection segment 152 and the extension line of the second installation part 12 is 15°~95°; and/or, the second connection segment 152 has a length greater than or equal to 1.5 mm. By setting the angle between the second connection segment 152 and the extension line of the second installation part 12 to be 15°~95°, that is, β=15°~160°, it is possible to greatly reduce the influence of the vertical vibration of the vibration unit 20 on the elastic support 10 and improve the reliability. The second connection segment 152 has a length greater than or equal to 1.5 mm, and as shown in FIGS. 11 and 12, the length of the second connection segment 152 is represented as $L_2$, $L_2 \geq 1.5$ mm, such that the second connection segment 152 has sufficient length to be soldered and fixed with the pad 40. As shown in FIG. 11, in one embodiment, there is an angle β=21° between the first connection segment 142 and the elastic part 13. As shown in FIG. 12, in another embodiment, there is an angle β=90° between the first connection segment 142 and the elastic part 13.

There is a distance $R_2$ between the bending midline of the second arc segment 151 and the bending center of the second arc segment 151, and the second arc segment 151 has a cross section with a width $B_2$, wherein $R_2 \geq 2B_2$, which may reduce the stress concentration at the bend of the second cushioning part 15, and reduce the risk of fracture of the elastic support 10.

In the present embodiment, the elastic part 13 comprises a first end connected with one of the two installation parts 10', and a second end connected with the other end of the two installation parts 10'; the elastic part 13 is formed by extending the first end to the second end in straight lines and/or curves in the same direction or in different directions. There is a central section between the first end and the second end. As shown in FIGS. 1-14, the elastic support 10 is formed by bending and extending a long and narrow line-like structure on the whole, wherein the elastic part 13 may be in a spiral structure, which is formed by extending its first end clockwise toward the central section to the central section, and then extending counterclockwise from the central section to the second end. The elastic part 13 may also be in a square spiral-like structure, which is formed by extending its first end toward the central section along a straight line and a curve to the central section respectively, and then extending to the second end from the central section along a straight line and a curve respectively. The elastic part 13 may also be in other structure formed by bending and extending a long and narrow line-like structure. The structure of the elastic part 13 may be set according to the actual use requirements, and the elastic support 10 of the present disclosure does not limit the structure of the elastic part 13. Compared with the existing corrugated sheet-shaped damper, the elastic support 10 of the present embodiment is formed by bending and extending a long and narrow line-like structure on the whole, which may reduce the stress concentration in the elastic support 10, increase the fatigue strength, and reduce the risk of fracture of the elastic support 10. In addition, the elastic support 10 maintains good compliance, which does not affect the vibration of the vibration unit 20.

In the present embodiment, the elastic support 10 has a segment cross-section in a closed loop structure formed by curves and/or straight lines. It should be understood that the segment cross-section of the elastic support 10 is a cross-section of bending segment of the line-like structure. For example, each time the elastic part 13 is bent, a bending segment is formed, and the cross section of the bending segment is the segment cross-section of the elastic support 10. The segment cross-section of the elastic support 10 of the present embodiment may be circular, elliptical, square, rectangular, racetrack shaped, rectangular-like, etc. The elastic support 10 may be directly wound by a round or square wire, or may be formed by pressing the cross section of the wire into an oval or rectangular shape by stamping after the wire is wound, so that the radial force of the elastic support 10 is obviously increased. And it is possible to ensure a good listening effect even in the case where the vibration unit 20 generates a large displacement at a low frequency.

The present embodiment also proposes an electronic device, which comprises a bracket 30, a vibration unit 20 and the above elastic support 10. The elastic support 10 is configured to counterbalance vibration of the vibration unit 20 in the first direction; the vibration unit 20 comprises a diaphragm and a voice coil 21 connected with the diaphragm; one installation part 10' is connected with the voice coil 21, and the other installation part 10' is connected with the bracket 30; and/or, the bracket 30 is a housing or a magnetic yoke. The electronic device may be a sound production device, a motor, a multifunctional vibration device, or the like. The specific structure of the elastic support 10 in the electronic device refers to the above embodiments. Since the electronic device adopts all the technical solutions of the above embodiments, it has at least all the beneficial effects brought by the technical solutions of the above embodiments, which will not be repeated herein.

As shown in FIGS. 1-3 and FIG. 14, in the electronic device of the present embodiment, there are at least two elastic supports 10, which are arranged at regular intervals along the outer circumference of the voice coil 21. In one embodiment, there are three elastic supports 10, which are arranged at regular intervals along the circumference of the vibration unit 20, thereby enhancing the centering effect on the vibration unit 20. Specifically, the at least three elastic supports 10 form at least three horizontal restraints on the voice coil 21 when the vibration unit 20 vibrates vertically, thereby preventing the vibration unit 20 from polarization; also, the elastic support 10 is displaced in the vertical direction following the vibration unit 20, thereby enhancing the centering effect on the vibration unit 20. In other embodiments, the number of elastic support 10 may be four, five, six, or another number. The number of the elastic support 10 in the electronic device of the present disclosure may be flexibly adjusted according to the actual situation, which is not limited in the present disclosure.

The electronic device may include at least one elastic group 50, which includes four elastic supports 10 located on the same horizontal plane. In the same elastic group 50, the four elastic supports 10 may have the same or different line widths or materials. For example, due to different material properties, the material of two of the four clastic supports 10 is phosphor bronze, and the line width thereof may be set to 0.4 mm; another elastic support 10 is made of beryllium copper, and the line width thereof may be set to 0.3 mm; and another elastic support 10 is made of 316 steel, and the line width thereof may be set to 0.2 mm.

Besides, in the four elastic supports 10 of the same elastic group 50, two of the elastic support 10 are conductive structures and the remaining elastic support 10 are non-conductive structures. The elastic support 10, which is a conductive structure, has a conductive function and may transmit an electrical signal to the vibration unit 20 of the electronic device. Specifically, the elastic support 10 is electrically connected and matched with a wiring portion of the voice coil 21 in the vibration unit 20 through one installation part 10', and the other installation part 10' is connected with an external power supply and then transmits an electrical signal between the voice coil 21 and the outside through the elastic support 10. In addition, the elastic support 10 restrains the reciprocating vibration of the vibration unit 20 according to a vibration deviation state of the vibration unit 20 by the elastic deformation of the elastic part 13, such that the vibration unit 20 is stabilized at a preset central section, which prevents the vibration unit 20 from polarization and makes the reciprocating vibration of the vibration unit 20 more stable. Therefore, the elastic support 10 has the functions of conduction and centering, and realizes the integration of the two functions. Therefore, only two elastic support 10 of the present disclosure need to be arranged in the electronic device to realize the conduction effect on the internal and external circuits and the centering effect on the vibration of the vibration unit 20 at the same time. In this way, it is not only possible to save the space in a cavity of the electronic device to further facilitate miniaturization of the product, but also effectively simplify the assembly process of the electronic device.

The electronic device may include a plurality of elastic groups 50, such as two or three elastic groups 50. The plurality of elastic groups 50 are arranged at intervals in the height direction of the voice coil 21, and all the elastic supports 10 of each elastic group 50 are located in the same horizontal plane. Taking the two elastic groups 50 as an example, the two elastic groups 50 are arranged at intervals along the vertical direction of the vibration unit 20, each elastic group 50 includes four elastic supports 10, and the four elastic supports 10 are located in the same horizontal plane. Eight elastic supports 10 of the two elastic groups 50 are arranged offset in the vertical direction, which not only enhances the centering effect on the vibration unit 20, but also has good mechanical stiffness Kms symmetry and flatness to meet fatigue requirements for large displacements. Compared with one elastic group 50, the plurality of elastic groups 50 enhance the centering effect on the vibration unit 20 on one hand, and reduce the stress concentration on the other hand, which can correspondingly reduce the line width of the elastic support 10 and facilitates manufacture thereof.

In the electronic device disclosed herein, the number and arrangement of elastic group 50, as well as the shape, structure, line width, material and properties of each elastic group 50 can be flexibly set according to actual needs, and it presents good compatibility and a wide range of applications.

The present also discloses a terminal, which includes the above electronic device. The terminal may be a computer, a cell phone, a speaker, and a car speaker applied to a car, etc. The terminal includes the above electronic device, and the specific structures of the electronic device and the elastic support 10 thereof are referred to the above embodiments. Since the terminal adopts all the technical solutions of the above embodiments, it has at least all the beneficial effects brought by the technical solutions of the above embodiments, which will not be repeated herein.

The foregoing are only preferred embodiments of the present disclosure and are not to be construed as limiting the scope of the present disclosure. Any equivalent structural transformation made by using the contents of the specification and the drawings of the present disclosure under the inventive concept of the present disclosure, or any direct/indirect application in other related technical fields are included in the scope of protection of the present disclosure.

The invention claimed is:

1. An elastic support, comprising two installation parts and an elastic part connected between the two installation parts, wherein the elastic part is in a polyline structure consisting of straight lines and/or curves, and wherein an end of each of the installation parts away from the elastic part is connected with a stationary component or a component that reciprocatively vibrates in a first direction; and at least one of the installation parts is provided with a first cushioning part including a portion bent from the end of the installation part away from the elastic part toward the first direction;

wherein the first cushioning part comprises a first connection segment and a first arc segment, the first connection segment connected with a component reciprocating in the first direction, and wherein the first connection segment is in smooth transition connection with the installation part through the first arc segment.

2. The elastic support of claim 1, wherein the elastic part is a planar structure arranged in a second direction, and is located in the same horizontal plane as the two installation parts, wherein the first direction and the second direction are perpendicular to each other.

3. The elastic support of claim 2, wherein the first arc segment is a circular arc segment whose inner concave surface is disposed facing away from the elastic part, and the first connection segment is a straight segment forming an angle of 20°~160° with the elastic part.

4. The elastic support of claim 3, wherein the first connection segment forms an angle of 45°~95° with the elastic part; and/or, the first connection segment has a length greater than or equal to 1.5 mm.

5. The elastic support of claim 2, wherein the first arc segment is provided in a Z shape, the first connection segment is a straight segment provided at a distance from the elastic part, and the first connection segment and the elastic part are set parallel to each other.

6. The elastic support of claim 5, wherein the first arc segment comprises first and second corners, wherein the first corner is connected with the installation part is a circular arc segment whose inner concave surface is disposed facing away from the elastic part, and the second corner is connected with the first connection segment is a circular arc segment whose inner concave surface is disposed facing toward the elastic part.

7. The elastic support of claim 5, wherein a distance between the first connection segment and the elastic part is greater than or equal to 0.5 mm; and/or, the first connection segment has a length greater than or equal to 1.5 mm.

8. The elastic support of claim 2, wherein the first arc segment is a semi-circular arc segment whose inner concave surface is disposed facing toward the elastic part, and the first connection segment is a straight segment and is located in the same horizontal plane as the elastic part.

9. The elastic support of claim 8, wherein a distance between the first arc segment and the elastic part is greater than or equal to 0.5 mm; and/or, the first connection segment has a length greater than or equal to 1.5 mm.

10. The elastic support of claim 2, wherein the two installation parts are respectively a first installation part and a second installation part, wherein the first installation part is provided with the first cushioning part, the second installation part is provided with the second cushioning part, the second cushioning part is located in the same horizontal plane as the elastic part, and the second cushioning part is bent toward or away from the elastic part from an end of the second installation part which is away from the elastic part.

11. The elastic support of claim 10, wherein the second cushioning part is an arc segment, a first end of which is connected with a stationary component or a component that reciprocatively vibrates in the first direction, and a second end of which is in smooth transition connection with the second installation part; or the second cushioning part comprises a second connection segment and a second arc segment, the second connection segment is connected with a stationary component or a component that reciprocatively vibrates in the first direction, and the second connection segment is in smooth transition connection with the second installation part through the second arc segment.

12. The elastic support of claim 1, wherein there is a distance R from a bending midline of the first arc segment to a bending center of the first arc segment, and the first arc segment has a cross section with a width B, wherein $R \geq 2B$.

13. The elastic support of claim 1, wherein each of the two installation parts is provided with the first cushioning part, and two first cushioning parts are of identical structures and are bent in the same direction or opposite directions.

14. The elastic support of claim 1, wherein the elastic part comprises a first end connected with one of the two installation parts, and a second end connected with the other of the two installation parts; and the elastic part is formed by extending the first end to the second end in straight lines and/or curves in the same direction or in different directions.

15. The elastic support of claim 14, wherein the elastic support is wound from a line structure; or, the elastic support is stamped from a sheet structure.

16. The elastic support of claim 14, wherein the elastic support has a segment cross-section in a closed loop structure formed by curves and/or straight lines.

17. An electronic device, wherein the electronic device comprises a bracket, a vibration unit and an elastic support of claim 1, wherein the elastic support is configured to counterbalance vibration of the vibration unit in the first direction; the vibration unit comprises a diaphragm and a voice coil connected with the diaphragm; the two installation parts are connected with the voice coil and the bracket, respectively;

and/or, the bracket is a housing or a magnetic yoke.

18. A terminal, wherein the terminal comprises an electronic device of claim 17.

* * * * *